(12) United States Patent
Roll et al.

(10) Patent No.: US 8,661,736 B2
(45) Date of Patent: Mar. 4, 2014

(54) VEHICLE GLASS RUN CHANNEL

(75) Inventors: James R. Roll, Ann Arbor, MI (US); Matthew C. Patterson, Warren, MI (US); Matthew M. Kunz, Washington, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 440 days.

(21) Appl. No.: 12/878,216

(22) Filed: Sep. 9, 2010

(65) Prior Publication Data

US 2012/0060422 A1  Mar. 15, 2012

(51) Int. Cl.
*E05D 15/16* (2006.01)

(52) U.S. Cl.
USPC .............................................. 49/441; 49/440

(58) Field of Classification Search
USPC .................. 49/440, 441, 495.1, 475.1, 489.1
See application file for complete search history.

(56) References Cited

U.S. PATENT DOCUMENTS

| | | | | |
|---|---|---|---|---|
| 4,969,294 A * | 11/1990 | Guillon et al. | | 49/495.1 |
| 5,007,202 A * | 4/1991 | Guillon | | 49/441 |
| 5,319,883 A * | 6/1994 | Gueneau et al. | | 49/489.1 |
| 5,377,449 A * | 1/1995 | Hineribara et al. | | 49/441 |
| 5,414,961 A * | 5/1995 | Tessier | | 49/441 |
| 5,493,814 A * | 2/1996 | Christian | | 49/479.1 |
| 6,023,888 A * | 2/2000 | Dover | | 49/441 |
| 6,185,869 B1 * | 2/2001 | Kawai | | 49/441 |
| 6,247,271 B1 * | 6/2001 | Fioritto et al. | | 49/490.1 |
| 6,817,651 B2 * | 11/2004 | Carvalho et al. | | 296/146.2 |
| 6,849,310 B2 * | 2/2005 | Willett | | 428/31 |
| 8,166,708 B2 * | 5/2012 | Ellis et al. | | 49/490.1 |
| 2004/0134132 A1* | 7/2004 | Baumann | | 49/441 |
| 2006/0086053 A1* | 4/2006 | Ellis | | 49/441 |
| 2008/0216411 A1* | 9/2008 | Okajima et al. | | 49/475.1 |
| 2010/0026042 A1* | 2/2010 | Ellis et al. | | 296/146.2 |
| 2010/0102597 A1* | 4/2010 | Ellis | | 296/201 |

FOREIGN PATENT DOCUMENTS

CN            1290218 A       4/2001

* cited by examiner

*Primary Examiner* — Gregory J Strimbu

(57) ABSTRACT

A glass run channel for a vehicle door window opening includes first and second mutually spaced legs having relatively high hardness, a trim lip comprising a member having relatively high hardness and a relatively soft laminate covering a surface of the member. The trim lip includes a hard low friction ramp. The laminate incorporates a low durometer bead and the trim lip includes a low durometer interface to one of the legs.

12 Claims, 2 Drawing Sheets

VEHICLE GLASS RUN CHANNEL

BACKGROUND OF INVENTION

This invention relates generally to a vehicle door, and more particularly to a channel that provides a run in which a glass window pane moves.

The door of a motor vehicle provides a glass run, which guides movement of a glass window pane as the door's window is opened and closed. A conventional header for the glass run exposes door paint visible from the occupant position between the glass run channel and the body-mounted seal when the door is closed, thereby inducing a low level of perceived quality.

Other header designs use lengthy trims to conceal the paint, but these components are extremely difficult to install and sometimes result in installation errors. Other techniques to conceal the paint employ a larger width glass run channel, which tends to generate wind noise.

A need exists in the industry for a door header extrusion that includes means for concealing the paint while providing easy, reliable installation of the weather strip and avoiding installation problems.

SUMMARY OF INVENTION

A glass run channel for a vehicle door window opening includes first and second mutually spaced legs having relatively high hardness, a trim lip comprising a member having relatively high hardness and a relatively soft laminate covering a surface of the member, sealing lips having relatively low hardness, secured to and extending from the legs, a lateral lip extending between and secured to the legs, the legs, trim lip sealing lips and lateral lip being formed in one piece.

The glass run channel seals a moveable glass pane, installs easily and seals against wind noise and water leakage with consistent reliability.

The glass run channel includes a long trim lip to conceal exposed paint, thereby improving the perceived quality of the vehicle.

Installation of the glass run channel on the door is facilitated by a dense ramp feature and use of material having a low coefficient of friction.

The glass run channel includes a reverse trim lip in combination with an engineered column and ramp feature to keep the lip in contact with the closed door.

The glass run channel avoids the cost of adding a door interior garnish molding, which hides the door paint visible to the interior occupant.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DETAILED DESCRIPTION

Figure 1:
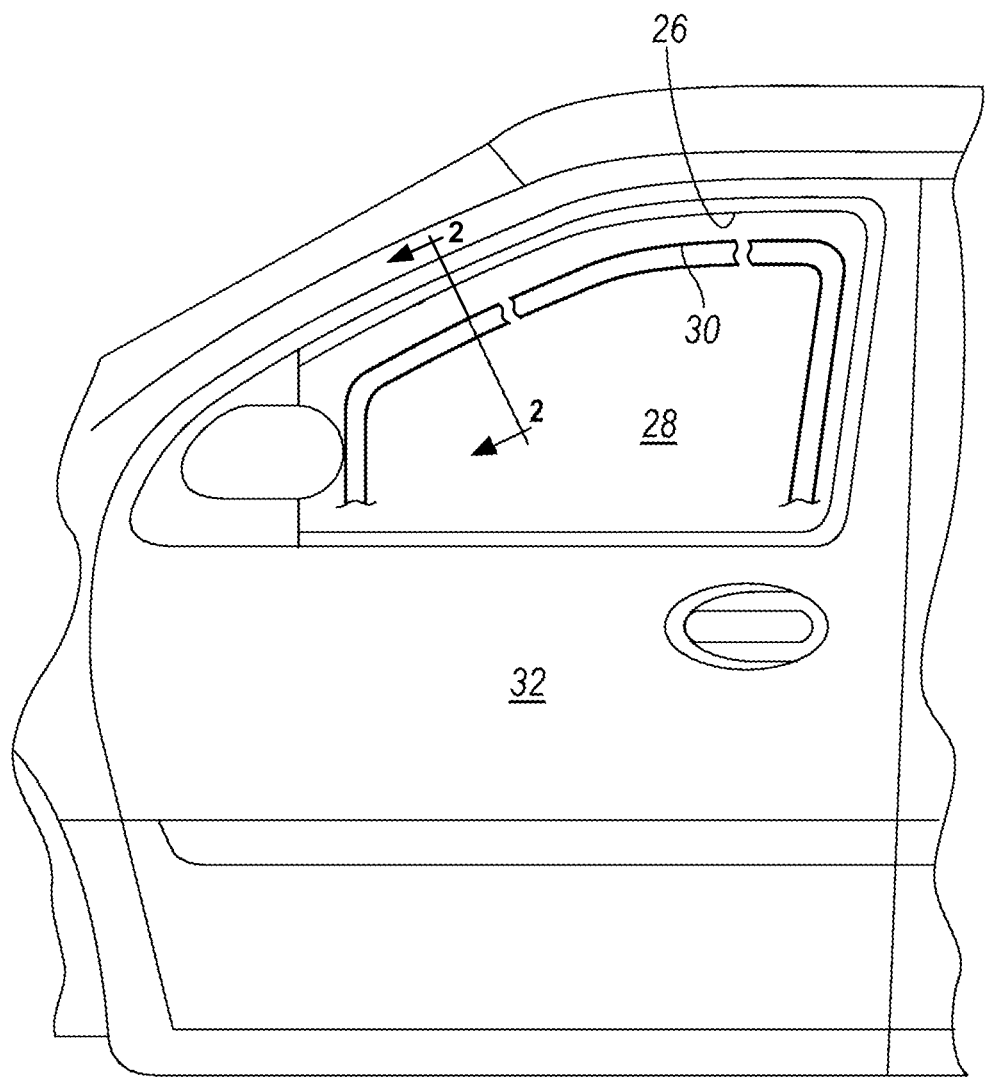
FIG. 1 is a schematic, side view of a vehicle door showing a glass run channel located in the window opening, with the glass run channel shown before being installed on the periphery of the window opening (a partially exploded view)

FIG. 1 shows a glass run channel 30 located for installation around the periphery 26 of a window opening 28 in a vehicle door 32, such as a door that provides access to a passenger compartment. When referring to glass run channel herein, it refers to an above beltline glass run channel that extends around the periphery of the window opening.

Figure 2:
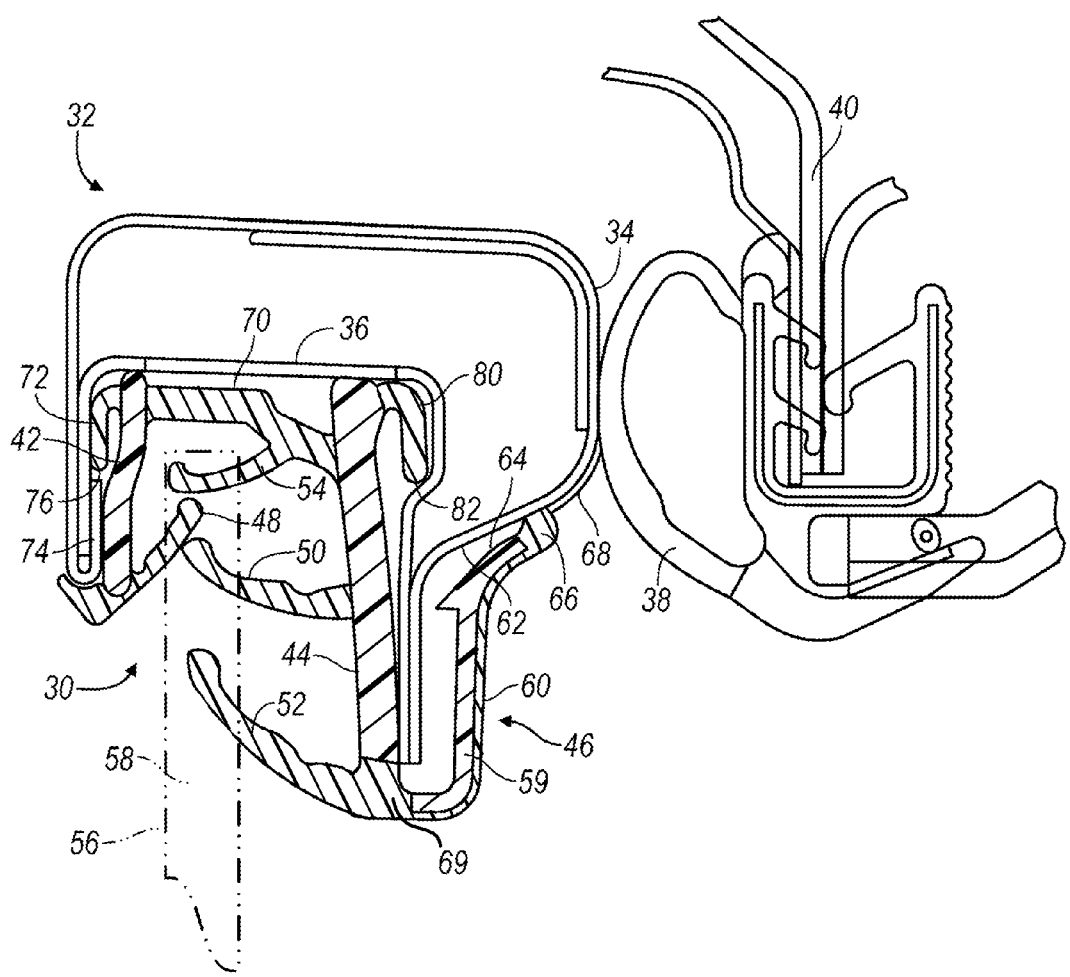
FIG. 2 is a schematic, cross section taken at plane 2-2 of FIG. 1, but with the glass run channel shown installed on the door.

As FIG. 2 illustrates, generally the door 32 is a welded assembly of sheet metal components including a door channel member 36. When the door 32 is closed, an inboard surface 34 of the door 32 contacts and compresses a bead seal 38, secured to the body 40 of the vehicle. Sealing lips (not numbered) securing the bead seal 38 to the body 40 are shown in their unflexed positions, but would be flexed to secure against the body 40 in an actual installation. The bead seal 38 is known to those skilled in the art and so will not be discussed further herein.

The glass run channel 30 is a unitary extrusion comprising legs, 42, 44; sealing lips 48, 50, 52, 54 extending outward from the legs; a trim lip 46; and a lateral lip, discussed below. The sealing lips 48, 50, 52, 54 are shown in their unflexed positions (i.e., the positions when the window is in a lowered position where the window glass does not contact the lips 48, 50, 52, 54). The legs 42, 44 have a relative high elastic stiffness and relatively high hardness, a preferred durometer being in the range 70 to 90 shore A. The sealing lips 48, 50, 52, 54 have a relatively low elastic stiffness, bending modulus and hardness relative to those of the legs, a preferred durometer being in the range 45 to 70 shore A.

Preferably the legs and lips of glass run channel 30 are coextruded of thermo plastic vulcanite (TPV); ethylene propylene diene monomer (EPDM), a type of synthetic rubber; polypropylene; or a combination of these materials. TPV provides a wide range of hardness from very hard to very soft and can be extruded with very low-friction coatings.

When in the window closed (up) position, the outboard surface 56 of the door's glass pane 58 contacts sealing lip 48, and the inboard surface of the glass pane can contact contacts three sealing lips 50, 52, 54. The sealing lips 48, 50, 52, 54 are flexed out of the way by the glass pane 58 as the window is closed, causing the lips 48, 50, 52, 54 to seal the passenger compartment against wind noise and water leakage. The sealing lips 48, 50, 52, 54 are shown unflexed, but would flex out of the way of the glass pane 58 when installed in the door 32 and in a closed (upward) position.

The trim lip 46 comprises an elastically stiff member 59, whose preferred upper and lower durometer range is substantially identical to that of the legs 42, 44, and a laminate 60 formed of appearance grade, soft material co-extruded with, and located on the interior surface of the trim lip 46. A preferred durometer of laminate 60 is in the range 45 to 70 shore A.

Trim lip 46 is formed with a ramp 64 inclined toward the interior of the vehicle. A bead 66 of the material of the soft laminate 60 located at an end of the ramp 64 contacts surface 62 of the door 32. No knit line, where the co-extruded materials of member 59 and laminate 60 meet, is visible. The trim lip 46 covers the surface 62 of the door 32 that would otherwise be visible to an occupant of the vehicle. The glass run channel 30 minimizes the width of an exposed paint stripe 68 on surface 62 to about 3 or 4 mm.

Soft material of the co-extruded glass run channel 30 is located at the intersection of leg 44 and member 59 providing a hinge area 69 that separates the member 59 from the sealing lip 52, allowing the ramp 64 on trim lip 46 to deflect laterally as it engages surface 62 of the door 32 when the glass run channel 30 is being installed.

The outboard end of a soft lateral lip 70 has a first finger 72 extending therefrom directed along the glass pane 58 between leg 42 and door member 36. The thickness of an overlapping strip 74 of the door member 36 faces the end 76 of first finger 72, thereby obstructing movement of the finger 72 out of the space that contains the glass run channel 30 in the door 32. When glass run channel 30 is being installed in the door, finger 72 deflects around the thickness of the door member 36 as the header legs 42, 44, and trim lip 46 are forced into the door member. Following its installation, finger 72 becomes captured between leg 42 and the adjacent surface of the door member 36, thereby retaining the glass run channel 30 in the door member.

Similarly, the inboard end of lateral lip 70 has a second finger extending therefrom 80 directed along the glass pane 58 between leg 44 and the door member 36. Door member 36 is formed with a joggle that faces the end 82 of the second finger 80, thereby obstructing movement of the second finger out of the space that contains the glass run channel 30 in the door. When glass run channel 30 is being installed in the door, finger 80 deflects around the joggle as the header legs 42, 44, and trim lip 46 are forced into the door member 36. Following its installation, finger 80 becomes captured between leg 44 and the adjacent surface of the door member.

With the trim lip 46 incorporating a low durometer bead 66 at the door surface interference and a low durometer interface 69 at the high hardness leg, this allows the trim lip to operate independently from the inboard leg 44—even though all features are formed in a one-piece extrusion.

Use of the relatively hard material for the legs 42, 44 along long portions of the glass run channel 30 facilitates installation of the glass run channel 30 in the door channel 36. The glass run channel 30 structurally separates the sealing functions from the trim function such that the trim lip 46 is not affected by the moving glass 58 in the door 32.

While certain embodiments of the present invention have been described in detail, those familiar with the art to which this invention relates will recognize various alternative designs and embodiments for practicing the invention as defined by the following claims.

What is claimed is:

1. A glass run channel for a vehicle door having a window opening, a portion of the window opening is defined by a door channel member having an outboard portion adjacent to an outside of a vehicle and an inboard portion adjacent to an interior of the vehicle, both the outboard and inboard portions extending toward a center of the window opening to define a recess for receiving the glass run channel, the glass run channel comprising:
    a first leg configured to be mounted in the recess adjacent to the outboard portion and a second leg configured to be mounted in the recess adjacent to the inboard portion, the first and second legs having a hardness of 70 to 90 shore A;
    a trim lip configured to extend inboard of, adjacent to, but not in contact with an inboard surface of the inboard portion, the trim lip having a hardness of 70 to 90 shore A and a laminate covering an inboard surface of the trim lip, the laminate having a hardness less than the hardness of the trim lip, and the laminate having a bead on a terminal end thereof, the bead configured to be in contact with the door channel member;
    a first sealing lip extending from the first leg and configured to engage an outboard surface of a window pane and a second sealing lip extending from the second leg and configured to engage an inboard surface of the window pane, the first and second sealing lips having a hardness less than the hardness of the second leg;
    a lateral lip extending from the first leg to the second leg and having a hardness less than the hardness of the second leg; and
    a length of material located between the trim lip and the second leg and defining an elastically flexible hinge area, the hinge area having a hardness less than the hardness of the trim lip.

2. The glass run channel of claim 1, wherein the glass run channel is an extrusion formed in one piece and comprises at least one of thermo plastic vulcanite, ethylene propylene diene monomer, and polypropylene.

3. The glass run channel of claim 1, wherein the trim lip is formed with a ramp extending toward the interior of the vehicle, and the bead being disposed at a terminal end of the ramp.

4. The glass run channel of claim 1, wherein an end of the first leg, adjacent to the lateral lip, is configured to be in contact with the door channel member.

5. The glass run channel of claim 1, wherein:
    an end of the second leg, adjacent to the lateral lip, is configured to be in contact with the door channel member.

6. The glass run channel of claim 1 further comprising:
    a first finger configured to extend outboard from the lateral lip and contact an inboard surface of the outboard portion of the door channel member, and a second finger configured to extend inboard from the lateral lip and contact an outboard surface of the inboard portion of the door channel member.

7. The glass run channel of claim 1 including a third sealing lip extending from the lateral lip.

8. A glass run channel for a vehicle door having a window opening, a portion of the window opening is defined by a door channel member having an outboard portion adjacent to an outside of a vehicle and an inboard portion adjacent to an interior of the vehicle, both the outboard and inboard portions extending toward a center of the window opening to define a recess for receiving the glass run channel, the glass run channel comprising:
    a first leg configured to be mounted in the recess adjacent to the outboard portion and a second leg configured to be mounted in the recess adjacent to the inboard portion, the first and second legs having a hardness of 70 to 90 shore A;
    a trim lip configured to extend inboard of, adjacent to, but not in contact with an inboard surface of the inboard portion, the trim lip having a hardness of 70 to 90 shore A and a laminate covering an inboard surface of the trim lip, the laminate having a hardness less than the hardness of the trim lip;
    a first sealing lip extending from the first leg and configured to engage an outboard surface of a window pane and a second sealing lip extending from the second leg and configured to engage an inboard surface of the window pane, the first and second sealing lips having a hardness less than the hardness of the second leg;
    a lateral lip extending from the first leg to the second leg and having a hardness less than the hardness of the second leg;
    wherein an end of the first leg, adjacent to the lateral lip, is configured to be in contact with the door channel member and an end of the second leg, adjacent to the lateral lip, is configured to be in contact with the door channel member; and a length of material located between the trim lip and the second leg and defining an elastically flexible hinge area, the hinge area having a hardness less than the hardness of the trim lip.

9. The glass run channel of claim 8, wherein the glass run channel is an extrusion formed in one piece and comprises at least one of thermo plastic vulcanite, ethylene propylene diene monomer, and polypropylene.

10. The glass run channel of claim 8, wherein the laminate has a bead on a terminal end thereof, the bead configured to be in contact with the door channel member, and wherein the trim lip is formed with a ramp extending toward the interior of the vehicle, and the bead being disposed at a terminal end of the ramp.

11. The glass run channel of claim 8 further comprising:

a first finger configured to extend outboard from the lateral lip and contact an inboard surface of the outboard portion of the door channel member, and a second finger configured to extend inboard from the lateral lip and contact an outboard surface of the inboard portion of the door channel member.

12. The glass run channel of claim 8 including a third sealing lip extending from the hinge area and configured to engage the inboard surface of the window pane, the third sealing lip having a hardness less than the hardness of the second leg.

\* \* \* \* \*